United States Patent [19]
Flood et al.

[11] Patent Number: 5,921,656
[45] Date of Patent: *Jul. 13, 1999

[54] WATER ACTIVATED EMERGENCY STROBE LIGHT

[76] Inventors: John F. Flood, 800 E. Tropical Way, Plantation, Fla. 33317; Mark S. Clark, 16631 SW. 59th Ct., Fort Lauderdale, Fla. 33331

[ * ] Notice: This patent is subject to a terminal disclaimer.

[21] Appl. No.: 08/794,814

[22] Filed: Feb. 4, 1997

[51] Int. Cl.⁶ ....................................................... F21L 7/00
[52] U.S. Cl. .......................... 362/186; 362/276; 362/802; 362/277; 362/280; 362/319
[58] Field of Search .................................... 362/186, 187, 362/200, 277, 284, 278, 280, 282, 276, 293, 802, 319, 320, 322, 281, 324, 158

[56] References Cited

U.S. PATENT DOCUMENTS

| | | |
|---|---|---|
| 1,600,067 | 9/1926 | Retze . |
| 2,623,934 | 12/1952 | De Bow et al. . |
| 4,152,755 | 5/1979 | Trosper et al. . |
| 5,014,171 | 5/1991 | Price, III . |
| 5,031,080 | 7/1991 | Aikens et al. . |
| 5,034,847 | 7/1991 | Brian ........................................ 362/208 |
| 5,134,558 | 7/1992 | Williams et al. . |
| 5,221,891 | 6/1993 | Janda et al. .............................. 362/183 |
| 5,294,924 | 3/1994 | Dydzyk .................................... 362/276 |
| 5,319,530 | 6/1994 | Kreutzer et al. . |
| 5,490,050 | 2/1996 | Clark et al. .............................. 362/200 |
| 5,633,623 | 5/1997 | Campman ............................... 362/83.3 |

*Primary Examiner*—Thomas M. Sember
*Attorney, Agent, or Firm*—Malin, Haley, DiMaggio & Crosby

[57] ABSTRACT

A hand-held water activated strobe light which may be used in rescue or emergency operations in peacetime or in a combat zone. The light includes a watertight housing with a high intensity bulb which flashes white light. Interchangeable blue and infrared filters attached to a flash guard body can be used with the bulb for filtering various wave lengths of light spectrum in combat situations and for both 360 degree or line-of-sight transmission. The strobe light is water activated and includes a sensor that deactivates the light during daylight hours. A memory latch circuit maintains activation of the light once the water activated switch comes in contact with water. A power saving circuit permits the use of alkaline batteries in place of mercury batteries, which also provides for environmental protection.

11 Claims, 7 Drawing Sheets

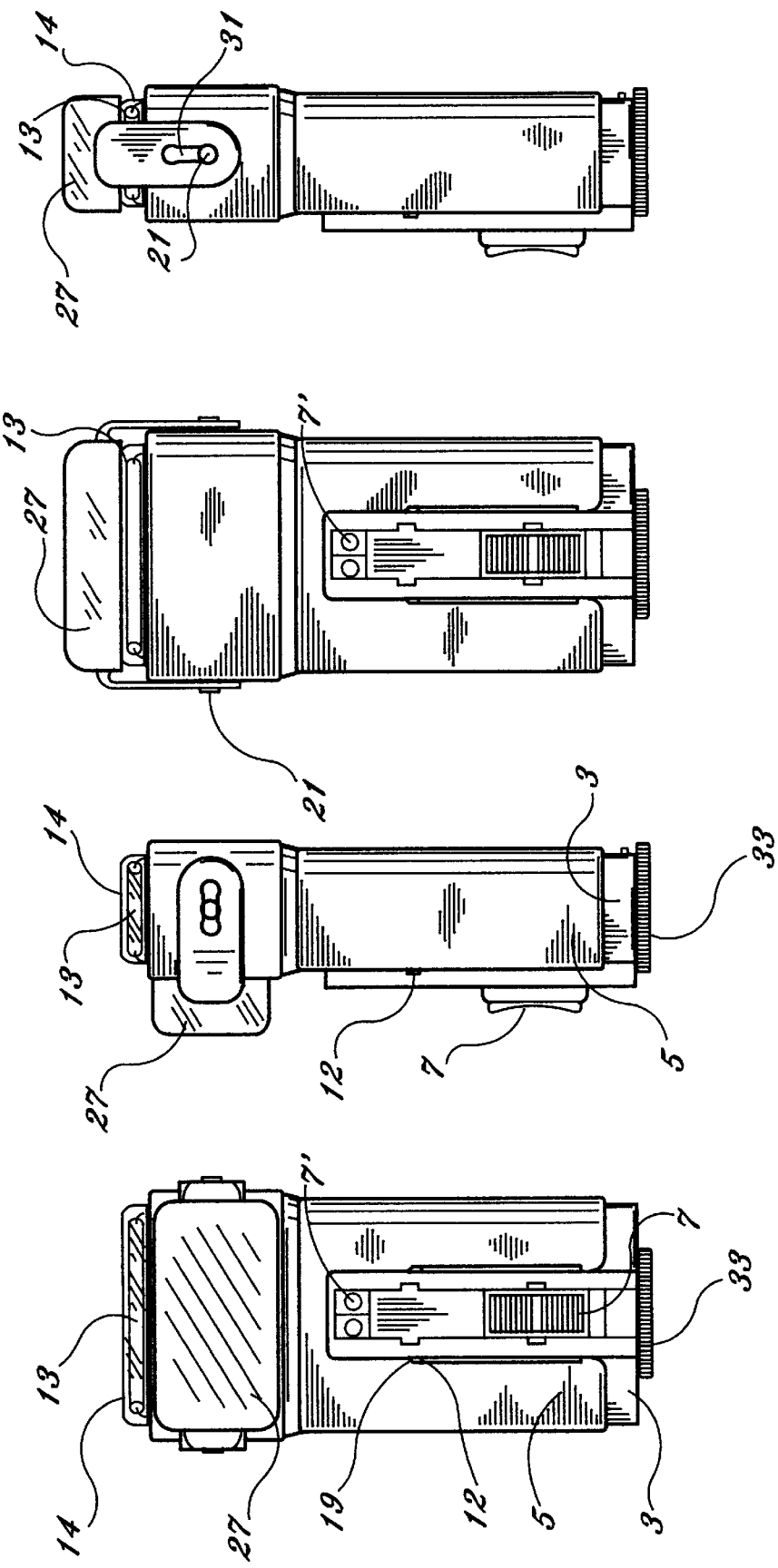

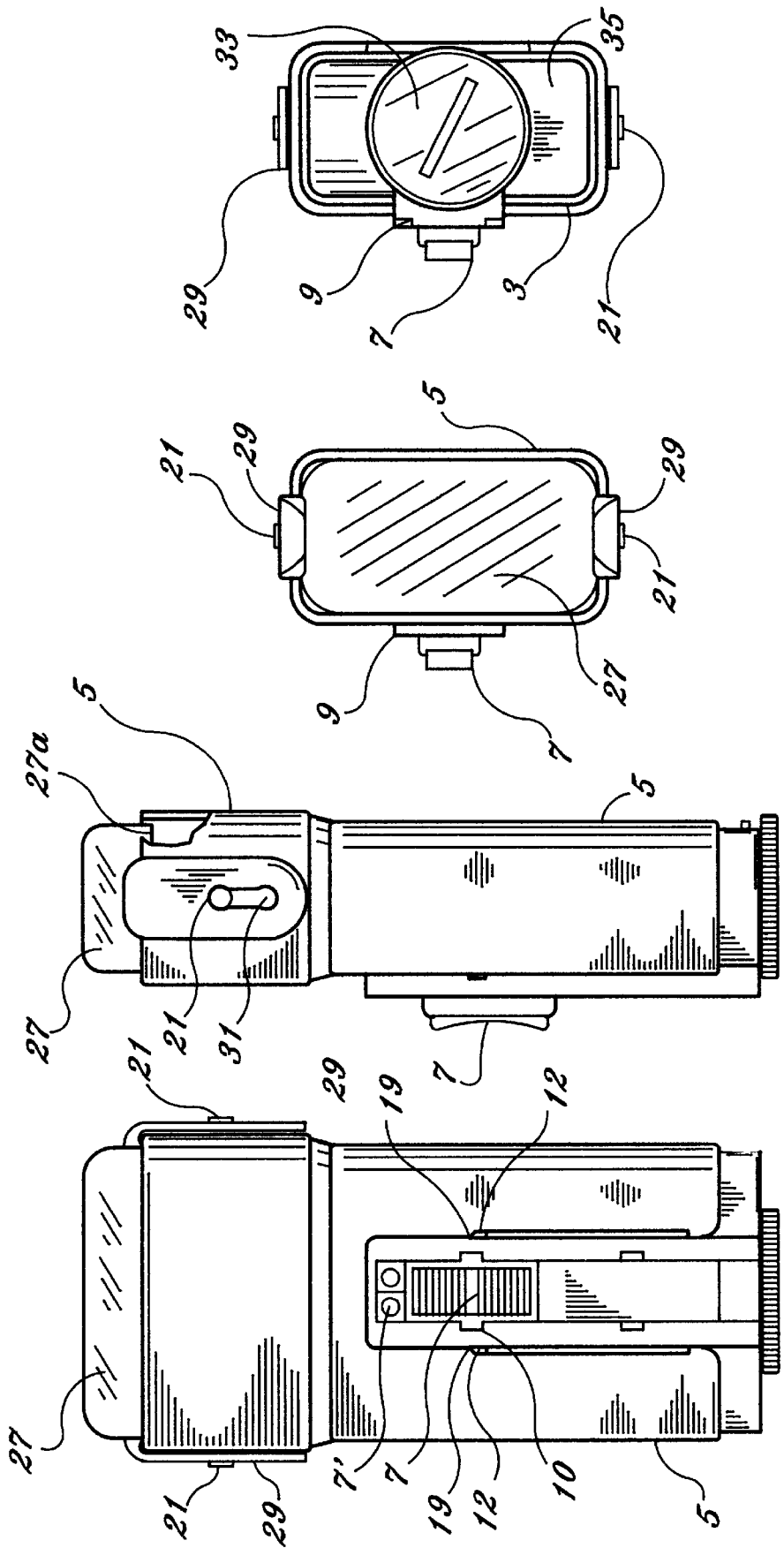

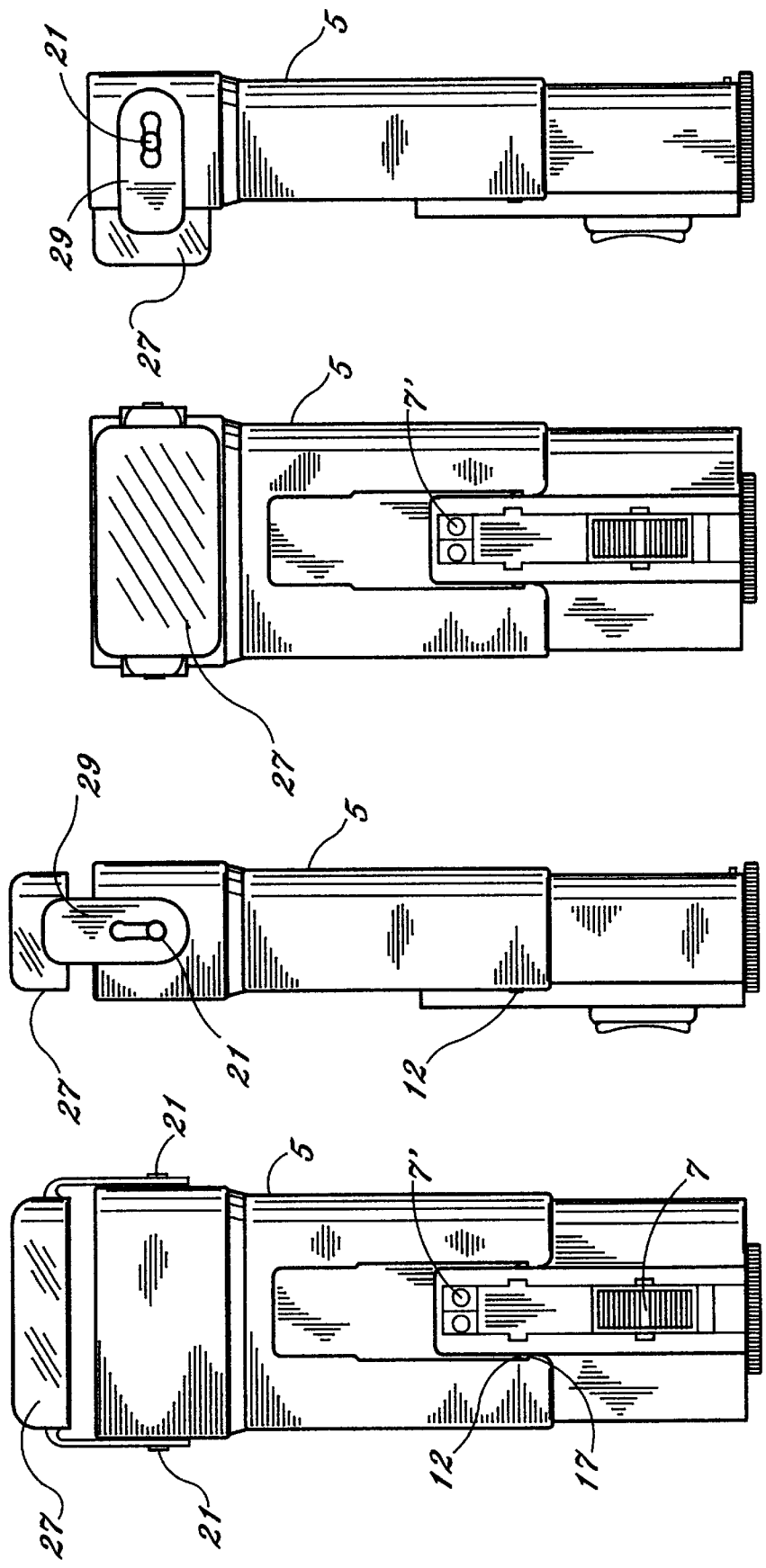

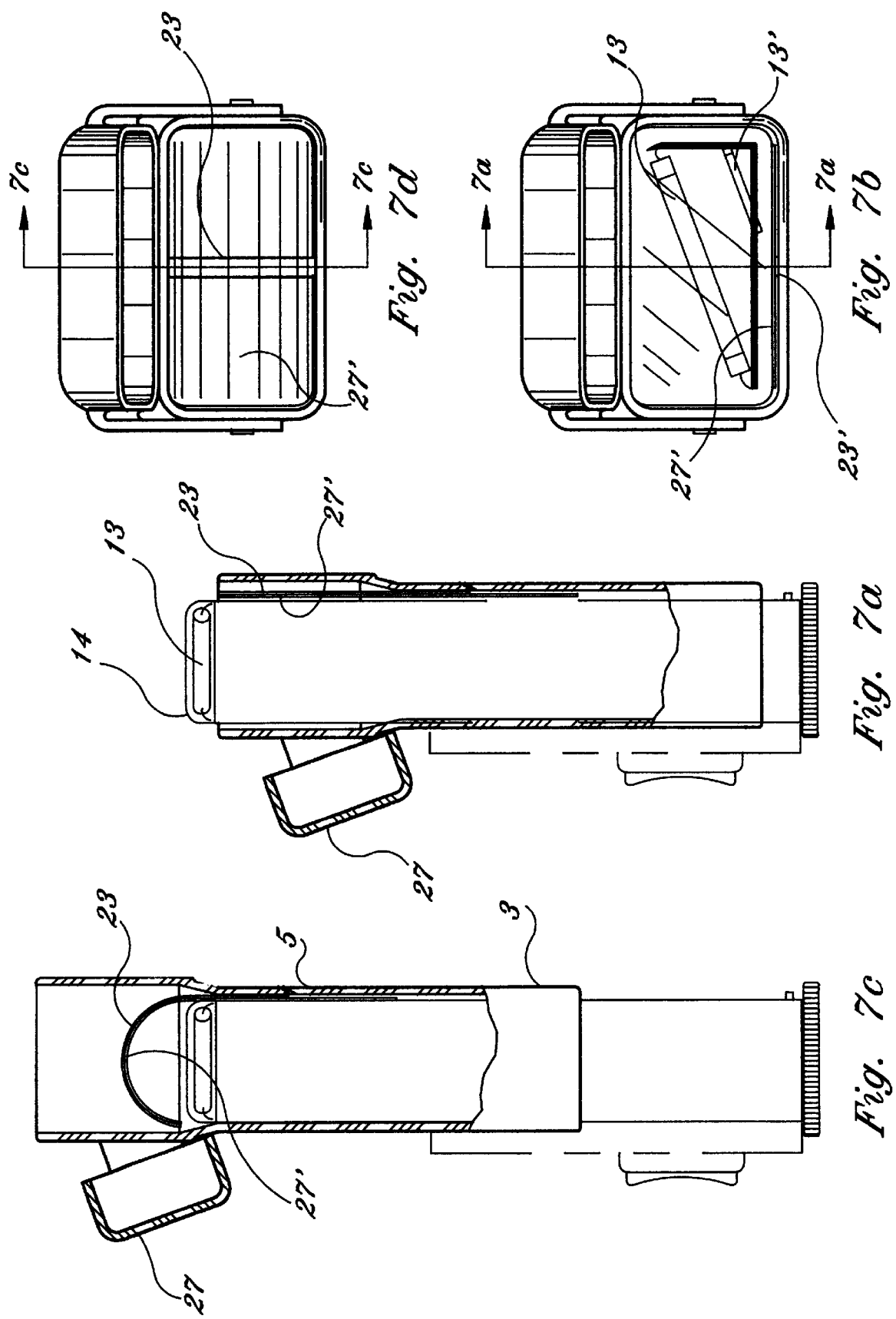

WATER ACTIVATED EMERGENCY STROBE LIGHT

BACKGROUND OF THE INVENTION

1. Field of the Invention

The present invention relates to portable emergency lights, and more particularly, to a self-contained, water activated, hand-held strobe light and distress marker which may be used with various light filters to alert emergency rescue personnel in a combat or non-combat water environment.

2. Description of the Prior Art

Strobe lights have been used for many years in order to make persons or objects more visually detectable. The strobing effect of the light, particularly at night, draws an observer's attention directly to the light. In nighttime emergency situations, this effect is very beneficial since persons in need of rescue often require prompt response from rescue personnel. Locating a person at night in the open sea is difficult, often because of the sheer size of the area that must be searched. The use of a strobe light enables emergency personnel to reach persons much more quickly since a bright, flashing strobe is very noticeable no matter what the conditions.

Portable strobe lights have been used by aviators for many years. Military aviators, often operating over large ocean expanses, have found the use of small strobe lights extremely effective in locating downed personnel. However, because the strobe light is visible in all directions, the use of such a light in a combat environment in enemy or hostile territory would also direct enemy forces to a downed aviator. Additionally, a bright flash might also be misinterpreted as a gun muzzle flash which could draw aircraft or ground fire. All of these disadvantages have indicated that there is a need for a small, lightweight, watertight, water activated, portable strobe light which may be used with one or more filters and which can be operated from a single, self-contained battery-operated source.

An example of an emergency strobe light is U.S. Pat. No. 5,490,050, (the '050 patent) the disclosure of which is incorporated herein by reference. The '050 patent was issued to Clark et al., and is assigned to the owner of this application. As can be seen by the disclosure, the device of the '050 patent has some of the features of the present invention, with the present invention being an improvement thereto.

The present invention provides a portable, water activated, hand-held emergency strobe light that can be used in both combat and non-combat water-born environments. If water activated in daylight, the strobe light will not turn on until darkness to conserve battery power. A special infrared (IR) strobe filter and circuit provides for daytime shut off of the strobe light. The light is powered by alkaline batteries with an energy saving circuit to extend the useable battery life.

SUMMARY OF THE INVENTION

The present invention is directed to a portable strobe light for use in emergency or distress situations for locating personnel in both combat and non-combat water-born environments. The light includes a flashing xenon bulb and a transparent or clear, water-protective bulb cover contained at one end of a small, hand-sized housing. The xenon bulb emits a bright, white light through the clear cover, and flashes approximately one flash per second.

A self-contained power source (battery) within the housing powers the bulb and associated circuitry while a manually-actuated, sparkproof power on/off switch lever mounted outside the housing actuates a switch controlling the electronic strobe circuit inside the housing. Once armed by the manual switch, a second, water activated switch, turns the light on upon coming in contact with water. Once the water activated switch comes in contact with water, a latching circuit maintains the water activated switch in the on position. To insure the light is only activated at night, a third switch, consisting of a photo sensor and associated circuitry, prevents the light from being activated during the day.

Once activated, the light will remain on until the light is turned off by the manually-activated switch, or when daylight returns, or when the battery becomes exhausted.

Special power saving circuitry allows the use of alkaline batteries. In general, mercury batteries have a slower voltage drop over time than alkaline batteries, however, the use of alkaline batteries is preferred due to the reduced environmental harm caused by alkaline batteries verses mercury and other type batteries. Special power saving circuitry makes the alkaline battery voltage discharge over time appear similar to the slower discharge rate of the mercury batteries.

The light includes a flash guard slidably mounted to the exterior housing, having a positionable peripheral light shield and two different light filters, each of which may be positioned over the strobe light by manual manipulation of the flash guard to provide different light emission wave lengths and directional profiles. The flash guard is optionally removable.

The light has three different operating modes, i.e. white only, infrared only, or blue only. The first light filter acts to block all visible light below infrared wavelengths. The second filter inside the flash guard is used independently of the infrared filter to block all but blue light. When the blue filter is in use, the flash guard on the housing is positioned so that a peripheral light shield around the xenon bulb creates a tunnelling effect to block peripheral transmission of the blue light, in a line-of-sight manner, for manual aim in a desired direction.

The strobe light housing is constructed of a rigid plastic material that is watertight and can be any shape but is preferably substantially rectangular in shape, having the xenon bulb mounted at one end underneath a clear, watertight plastic bulb cover. A manually operated, slidable on/off switch actuator is mounted externally on one face of the housing, and is a waterproof switch that arms the battery and the strobe light bulb through internal circuitry.

A water activated switch, connected to a latching circuit, is mounted on another face of the housing to activate the light when in water. A photosensor is mounted near the bulb under the watertight plastic bulb cover to prevent activation in daylight. The sensor is a special photosensor that is sensitive to infrared light rays. A photosensor activated by visible light rather than infrared light rays would not prevent the light from becoming activated when the infrared filter is in place.

When the IR filter is manually positioned in place, the IR filter covers the light bulb and the sensor. The infrared filter blocks the transmission of light having wavelengths below the infrared region of the electromagnetic spectrum, which includes visible light. Therefore, if the photosensor were sensitive to visible light, the infrared filter would block the transmission of visible light, the sensor would receive no input, and allow activation of the strobe light during the day. By making the photosensor sensitive to infrared radiation, the filter will not permit activation of the strobe light during the day because sunlight contains infrared rays that penetrate the infrared filter and impinge upon the infrared sensor, thus preventing activation of the strobe light during the day.

In an alternate embodiment, the strobe can be supplied without the infrared or blue filter. In this embodiment, the photosensor can be sensitive to visible light and prevent activation during the day.

Without the flash guard, the strobe light would operate in a normal fashion, providing pulsed, high intensity white light in a 360° area, hemispherically surrounding the strobe light when activated.

The flash guard, in accordance with the present invention, is a rectangular, hollow body that fits slidably over the exterior portions of the strobe light housing while still exposing the on/off switch actuator and water switch. The flash guard, once installed on the housing, is optionally removable. The flash guard is normally kept in a storage or stored position in which the infrared filter forms a light seal over the clear protective cover of the strobe bulb and infrared sensor. If the light were activated in the storage position, only infrared rays would be emitted, unobservable by human beings. The shape and configuration of the infrared lens allows for a snug fit above and around the clear bulb cover in the storage position. The peripheral edges of the infrared filter overlap inwardly into the body of the flash guard, forming a light seal around the edges. In the flash guard storage position, the flash guard body and infrared filter is mechanically locked in place and can be moved only by deliberate manual manipulation to change operation modes.

The flash guard has an external, movable infrared filter that covers the clear bulb cover in the storage mode and allows only infrared light to pass from the strobe light, and an internal blue light filter that is positioned over the white strobe light when the flash guard body is moved to a particular position longitudinally relative to the strobe light housing. Thus, the flash guard body is moveable longitudinally to provide multiple positions for manually providing different light frequencies and area distribution, depending on the situation.

The present invention allows for three different light-emitting conditions for the strobe light viz. white, blue or infrared light. In the flash guard storage position, the exterior IR filter on the flash guard covers the white strobe light, bulb cover, and infrared sensor with an infrared filter, such that only infrared light is allowed to pass through the filter. In many military and combat environments, the use of infrared equipment is well known, including infrared detectors that are used at night for locating various objects radiating IR energy. The IR filter can be rotated manually 90° from the flash guard stored position to a position out of the way of the white strobe light to provide a white light operating condition. In the white light operating position, the white light is prominently displayed and exposed outside of the flash guard for normal operation emitting white light, 360° peripherally and 180° elevationally. The blue filter operating position is achieved by sliding the flash guard body relative to the strobe light housing, causing the blue filter to move into position over the white strobe light and bulb cover within the flash guard body passage which acts as a peripheral shield. In a combat situation, a downed aviator, for example, could use the infrared filter in the storage position and direct IR rays in the direction of a helicopter or other equipment known to have infrared detecting equipment. The infrared detector operator could then observe a pulsing, infrared signal, not visible to the human eye in the area. This could be useful in peacetime or combat situations. Inside the flash guard body, when moved to the blue filter position, a dark blue light filter allows only dark blue light to pass in a line-of-sight fashion from the top opening of the flash guard. This would be highly directional by the person holding the light, and could be directed in a known direction of friendlies, who could observe and expect to see a blue light, indicating friendly downed personnel. Such a line-of-sight method could also be directed at overhead aircraft if the downed person realized that they were friendly aircraft looking for the downed person. The blue light would positively identify the person and would not be confused with muzzle flashes from firearms. Also, surrounding personnel would not be able to see the blue light because of the shield formed by the flash guard.

Thus, the present invention is capable of peacetime and combat usage, can emit white, strobed light, or an infrared or blue light, shielded, depending on the circumstances, by mere manipulation of a flash guard contained on the strobe light housing.

It is an object of this invention to provide a portable emergency strobe light for locating downed personnel in water borne areas that is useful in both peacetime or combat environments that is water activated.

It is another object of this invention to provide a water activated strobe light for emergency location of downed personnel that includes a latching circuit that maintains the water activated switch in the on position after the water activated switch comes in contact with water.

A further objective of the present invention is a water activated emergency strobe light that includes a photosensor that permits activation of the strobe light only at night.

And yet a further object of this invention is to provide a water activated emergency strobe light that includes a power saving circuit that permits the use of alkaline batteries efficiently.

It is still another object of this invention to provide a water activated emergency strobe light having three different selectable modes of light transmission and emission, including white light, or infrared light that are directed hemispherically, or blue light that can be directed in a particular line of sight, all modes using the same strobe light source.

In accordance with these and other objects which will become apparent hereinafter, the instant invention will now be described with particular reference to the accompanying drawings.

BRIEF DESCRIPTION OF THE DRAWINGS

FIG. 2a is a front elevational view of the strobe light with the flash guard in its retracted position, and the infrared lens pivoted to expose the white light.

FIG. 2b is a side elevational view of that shown in FIG. 2a.

FIG. 3a is a front elevational view of the strobe light, with the flash guard in a retracted position, with the infrared lens extended above the clear lens, an intermediate position.

FIG. 3b is a side elevational view of that shown in FIG. 3a.

FIG. 4a is a front elevational view of the strobe light and flash guard in the retracted position with the infrared lens retracted over the clear lens in the flash guard storage position and IR operation position.

FIG. 4b is a side elevational view of that shown in FIG. 4a.

FIG. 4c is a top plan view of that shown in FIG. 4a.

FIG. 4d is a bottom plan view of that shown in FIG. 4a.

FIG. 5a is a front elevational view of the strobe light and flash guard, shown with the flash guard in an extended position, with the infrared lens extended over the clear lens, a non-operable transition position while moving the infrared lens to an out of the way position.

FIG. 5b is a side elevational view of that shown in FIG. 5a.

FIG. 6a is a top view of the strobe light and flash guard, shown extended, with the infrared lens in a non-operable out of the way position.

FIG. 6b is a side elevational view of that shown in FIG. 6a.

FIG. 7a shows a side cross-sectional view, through lines 7a–7a shown in FIG. 7b, of the strobe light where the blue lens and spring are stored along a side of the lamp housing.

FIG. 7b shows a top view of that shown in FIG. 7a.

FIG. 7c shows a side cross-sectional view of the strobe light, through lines 7c–7c shown in FIG. 7d, in which the light is in an extended position and the blue lens is bent in a U-shape over the clear cover.

FIG. 7d shows a top view of that shown in FIG. 7c.

DESCRIPTION OF THE PREFERRED EMBODIMENTS

Figure 1:
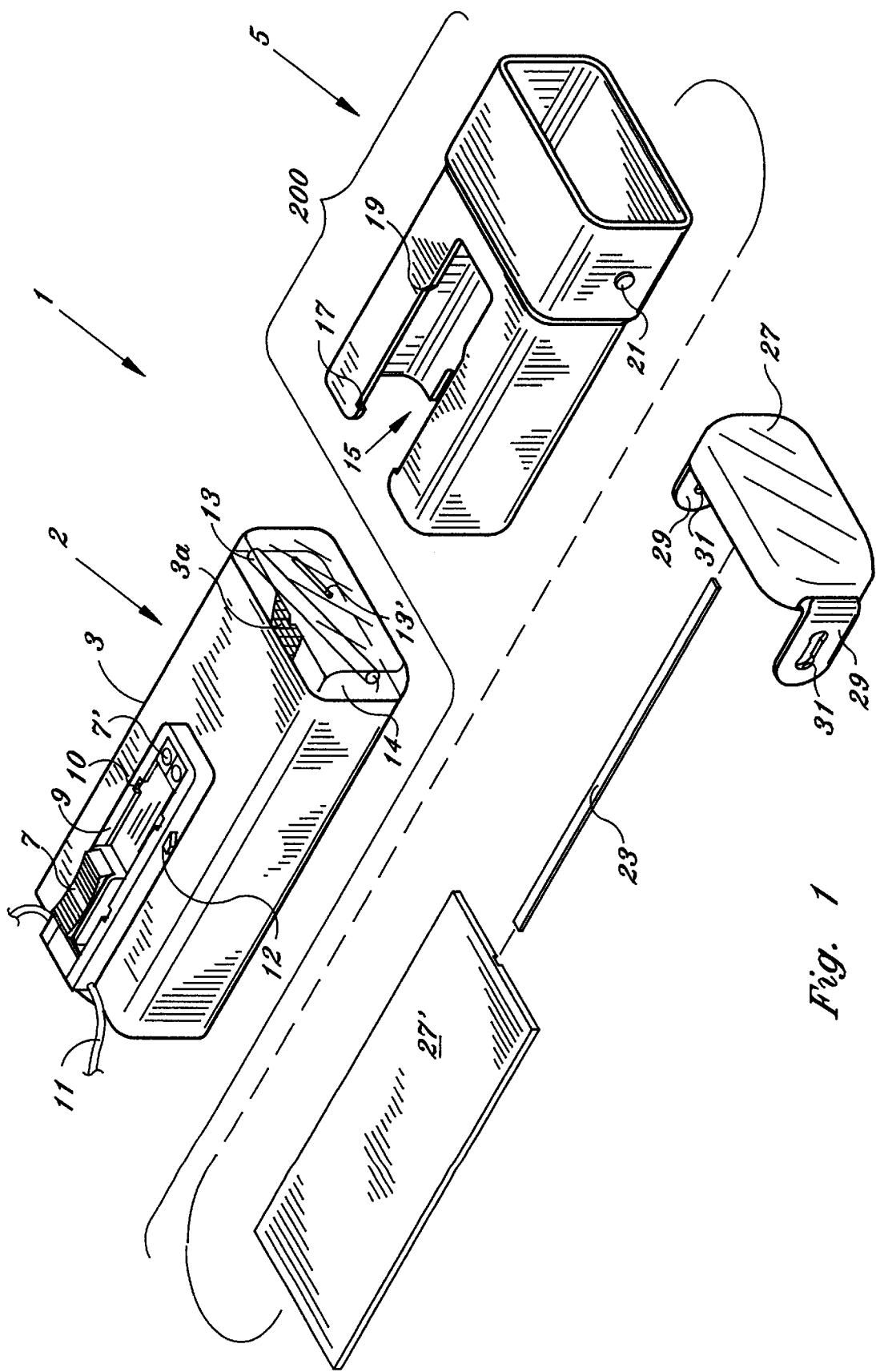
FIG. 1 is an exploded perspective view of the strobe light, including flash guard, showing the present invention.

With reference to FIG. 1, the invention 1 is shown comprising a strobe light 2, and depicts each of the components in an exploded format. The strobe light 2 is comprised of a main exterior housing 3, and a clear, watertight, transparent bulb cover 14. The housing 3 is manufactured of a durable, polycarbonate plastic, and may be colored brightly, such as bright orange or the like, for ease in detection. Alternatively, housing 3 may be colored black or olive to insure the unit's stealth. The main housing 3 includes a waterproof, manual light activating switch actuator 7 for activating an internal strobe light bulb electrical circuit shown in FIGS. 8a and 8b. Switch actuator 7 is a sparkproof magnetic switch which will neither spark nor ignite combustible gases or fuels when actuated. This feature is critical in the event of an aircraft or boating accident where a flammable gas or liquid may be on or near the user hand-held rescue light.

Housing 3 includes a switch guide and retainer channel 9 for sliding longitudinal movement of the switch actuator 7 therein between "on" and "off" positions of the light bulb. Four switch actuator detents 10 act to hold a retaining pin (not shown) attached to a lower portion of the switch actuator 7 within switch guide 9. These detents 10 hold switch actuator 7 into a respective on or off position. A lanyard 11 passes through an aperture at the lower end of switch guide 9 and is used to attach the strobe light 1 to the hand or other fixed object.

At the upper end of the strobe light housing 3, a flash lamp or xenon light bulb 13, as seen in FIG. 1, is connected to a fixed panel 3a, having a reflective surface. Flash lamp 13, when actuated by the flash circuit, emits approximately 250,000 peak lumens per flash at an initial flash rate of 60 FPM +10 FPM. Flash lamp 13 is a xenon bulb or the like, and emits a white, visible light at a frequency range between approximately 4,000 and 7,700 Å. The visibility of flash lamp 13 exceeds one nautical mile on a clear, dark night. At the top of flash lamp 13, a clear, transparent cover 14 allows light transmission through the cover 14 while guarding the bulb 13 against damage due to moisture or collision with foreign objects.

Also at the upper end of strobe light 2, located near bulb 13 and under cover 14, is photosensor 13'. Photosensor 13' is sensitive to infrared (IR) energy, and prevents the activation of strobe light 2 during daylight hours when light rays are received at sensor 13'. Sensor 13' prevents strobe 2 from wasting battery power by uselessly flashing during the day.

Figure 8A:
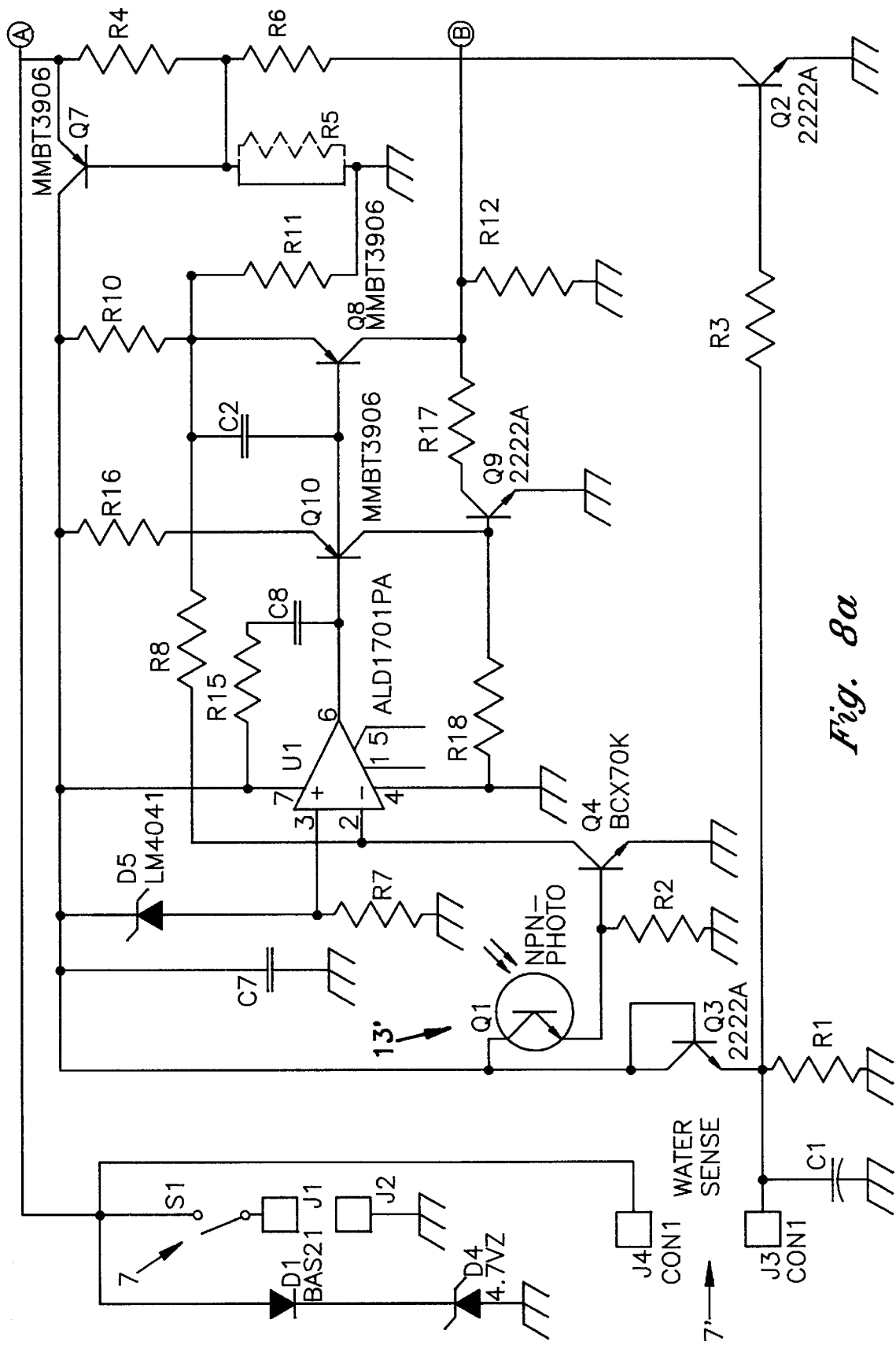
FIG. 8a and 8b is a schematic diagram of the strobe light operational circuitry.
Figure 8B:
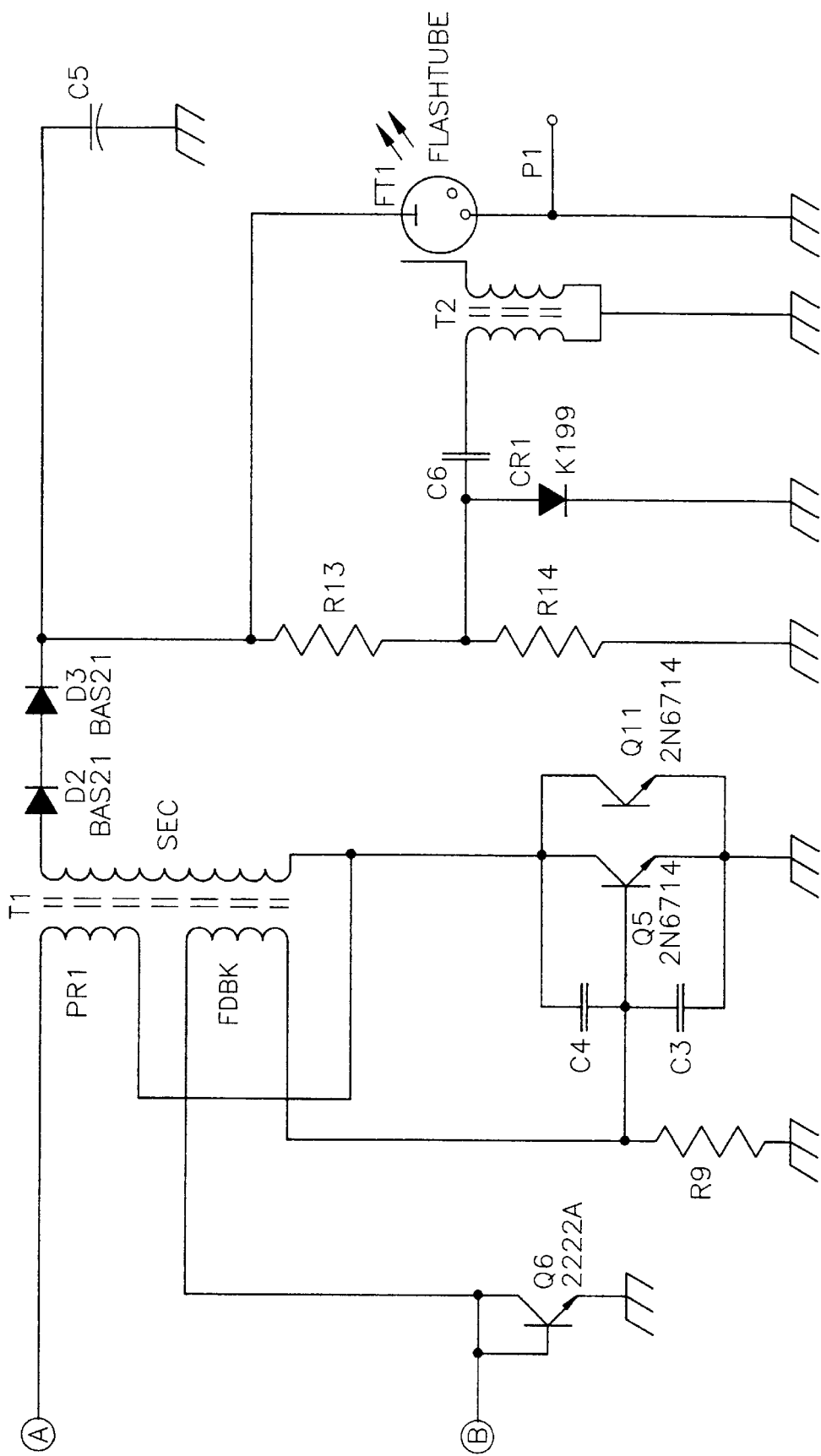

At the lower end of housing 3, water activated switch 7', upon coming in contact with water, activates strobe light 2's control circuitry, shown in FIGS. 8a and 8b. Water activated switch 7' is located in any suitable location such as that shown in FIG. 1. In the preferred embodiment, assuming manual switch 7 is in the "on" position, once water activated switch 7' comes into contact with water, strobe light 2 will remain "on" until deactivated. Strobe Light 2 can be deactivated by either infrared light rays reaching IR sensor 13', or switch 7 being turned to the "off" position.

Thus, strobe light 2 will only be activated if manual switch 7 is turned on, no infrared light rays are being received by IR sensor 13', and water activated switch 7' has come in contact with water.

A memory latch circuit, as shown in FIGS. 8a and 8b and fully described herein below, prevents strobe light 2 from becoming deactivated if water activated switch 7' comes in contact with water and is then removed from water. The memory latch circuit maintains activation on strobe light 2 until deactivated by one of the two methods described, or by exhaustion of the battery. In this manner, if a rescue victim crawls from the water into a raft or onto floating debris removing the emergency strobe light from contact with water, the strobe light will not turn off.

The strobe light housing 3 fits within the hollow passage 15 of flash guard 200 and flash guard body 5. The flash guard and its light filters are movable relative to the strobe light housing and bulb between three different operating positions, explained below. Switch guide 9 fits within a cut out area on one face of flash guard body 5, so that the switch actuator 7 protrudes above the flash guard body surface. The flash guard body 5 also has an internally mounted blue light filter 27' along with spring 23 that bends translucent plastic blue light filter 27' over cover 14. As best seen in FIGS. 7a–7d, spring 23 forces blue filter 27' downward over the top of clear cover 14. This occurs when the flash guard body 5 is longitudinally, manually pulled along strobe light housing 3 into an extended position. A second light filter, plastic infrared light filter 27, (hereinafter referred to as IR strobe filter 27) includes rigidly attached support members 29 and corresponding position holding apertures 31. A pair of mounting posts 21 are rigidly attached to the upper portion of the flash guard body 5, one on each side, which fit through and over apertures 31 and allow the IR strobe filter 27 to be manually pivoted about the posts 21 between an operable position when the flash guard is in a stored position, and pivoted to an out of the way position to expose the white or blue light modes.

In FIGS. 4a, 4b, and 4c, the strobe light with the IR strobe filter 27 is shown in the flash guard storage or stored position. In the stored position, IR strobe filter 27 rests on top of the flash guard body 5, above and covering bulb 13. As seen in FIG. 4b, IR strobe filter 27 and lower edge 27a is positioned to overlap below the top edge of the flash guard body 5 to act as a white light seal around the upper edge of the body 5. The flash guard body 5 is not extended. Position barrier tabs 12, extending from the switch guide 9 on each side, press against the upper position detent 19 so the flash guard body 5 cannot be moved toward the strobe light housing base. The IR filter can be used in this position by switching on the light. Only IR rays will be emitted.

In FIGS. 2a and 2b, the IR strobe filter 27 has been moved (pivoted) from the flash guard storage position and IR operating position to an out-of-the-way location that exposes white light bulb 13 and clear cover 14. This is the white light operating position.

FIGS. 3a and 3b show the longitudinal extent (manually) of the IR strobe filter 27. The IR strobe filter 27 can be moved from a side position (FIGS. 2a and 2b) upwardly into an IR operable position directly above, covering the clear cover 14, as shown in FIGS. 4a and 4b. FIG. 3b specifically shows that the mounting post 21 is at the rear of slot 31. Thus, in the IR operating position, the IR strobe filter 27 snaps downward over the clear cover 14. This is best seen in FIGS. 4a and 4b. FIG. 4b shows the mounting post 21 (one on each side) at the upper portion of slot 31 after the IR strobe filter 27 has been snapped into the IR emitting operating position. The IR strobe filter 27 perimeter 27a overlaps and fits snugly into a recess created by the junction of clear cover 14 and main housing 3. IR strobe filter 27 totally overlaps clear cover 14 to provide a completely leakproof light barrier. Support member 29 also holds IR strobe filter 27 by its frictional engagement with the outer surface of the flash guard body 5. A tight fit is required to prevent visible light emitted from the flash lamp bulb 13 from being emitted around the edges of the IR strobe filter 27.

The IR strobe filter 27 is made of durable plastic and acts to filter visible light below approximately 7,500 Å. As specified above, the IR strobe filter 27 is made generally of a concave shape, and is C-shaped in cross section. This allows a snug fit and overlap that conforms in shape over the clear bulb cover 14 to prevent any visible light from escaping around the edges of the cover 29.

Since the IR spectrum ranges from approximately 7,500 Å to above 36,000 Å, the IR strobe filter 27 filters out visible light below approximately 7,500 Å, allowing only IR frequencies to pass through the filter. Using an IR detection system (not shown), this IR light source can be readily detected. The IR is normally invisible and undetectable to the naked eye, useful in a combat situation. Hence, the strobe light 13, using IR strobe filter 27, can be used by the military or others who wish to avoid detection to all persons except those with IR detection equipment.

Photosensor 13' must be sensitive to infrared light above 7,500 Å to operate correctly when IR strobe filter 27 is in position covering bulb 13 and sensor 13'. A special infrared sensor can be used, or a standard photo sensor that is sensitive to light above 7500 Å can be used to form sensor 13'.

FIGS. 4a, 4b, 4c, and 4d show the IR strobe filter 27 in its operational position. This is also the compact stored position of the flash guard and the entire strobe light. Switch actuator 7 is shown in its "on" position. FIG. 4c shows the IR strobe filter 27 fitting completely over the flash lamp 13, infrared sensor 13', and clear cover 14. FIG. 4d shows the access door to the internal battery compartment (not shown) within strobe light housing 3. A screw member 33 includes an elongated, threaded shaft (not shown) which engages inside the strobe light housing 3 to hold the access door 35 to the battery housing. The battery housing typically holds two AA alkaline batteries, or in the alternative, two AA lithium iron sulfide batteries if a long shelf life is desired. The screw member 33 and rubber gasket (not shown) surrounding the access door 35 insure the battery compartment is tightly sealed and is both vibration proof and waterproof to a depth of approximately thirty meters.

FIGS. 5a, 5b and 6a, 6b show the flash guard body 5 in a longitudinally (manually) extended position relative to the strobe light housing 3 required to move the IR strobe filter 27 when it is desirous to use the blue filter 23 and to shield light emission laterally for line-of-sight transmission. The blue filter 23, when moved by a flexible spring, or bendable wire, over the flash lamp 13, acts to transmit light at approximately 5,500 Å. The blue filter 23 would be used during nighttime in a combat area for positive identification by a friendly and direct line-of-sight positioning by the user to aim the blue light beam at a friendly aircraft or position without detection by the enemy.

For a white flashing strobe light, the IR strobe filter 27 is manually extended and pivoted about its mounting posts 21 where it is moved out of the way of clear cover 14 and into its stored position as seen in FIGS. 6a and 6b. As seen in FIG. 6b, the IR strobe filter 27 may be positioned flat against the surface of flash guard body 5. The flash guard body 5 stays in the retracted position for use of the white strobe light. Lower position detent 17 prevents the strobe light housing 3 from being totally disengaged and removed from the flash guard body 5.

As seen in FIGS. 7a, 7b, 7c and 7d, when the strobe light housing 3 is extended relative to the flash guard body 5, bulb 13 and cover 14 are moved into a position behind blue filter 27'. Blue filter 27' is stored in an extended position along the side of strobe housing 3. Blue filter 27' is relatively thin and pliable, capable of bending and flexing into a U-shape repeatedly without damage. Spring 23 is also positioned adjacent and against the outer surface of blue filter 27'. The spring 23 may be approximately the same length as blue filter 27' and has a narrow dimension so a limited amount of filter area is covered. Spring 23 is typically positioned down the center of blue filter 27' in order to facilitate ease of movement. Alternatively, the spring may be placed at either side of blue filter 27'. FIG. 7a shows a side sectional view of blue filter 27', in a stored position, inside of the strobe housing 3. FIG. 7b shows a top view of blue filter 27' in its stored position. FIG. 7c shows a side sectional view of the extension of housing 3 relative to the flash guard body 5. As flash guard body 5 is moved into position, spring 23 is exposed at the upper portion of flash guard body 5 and tends to bend into its naturally U-shaped position. In turn, the spring 23 forces the pliable upper portion of blue filter 27', which is beneath spring 23, downward. As seen in the figure, blue filter 27' flexes and bends into a U-shape over the top of clear cover 14. FIG. 7d shows a top view of spring 23 providing a biasing force to bend blue filter 27' thereby covering flash lamp bulb 13 and clear cover 14. When retracting the flash guard body 5 back into the position shown in FIG. 7a, the surface of strobe housing 3 forces both spring 23 and blue filter 27' back into a straight position where it is again stored until its use is required.

When extending the strobe light housing 3 relative to flash guard body 5 to use blue filter 27', the upper portion of flash guard body 5 is moved so that the inner channel encompasses the blue filter to create a lateral peripheral light barrier or tunnel to effect line-of-sight directionality by manually pointing the light in a desired direction. This allows blue light which is emitted from blue filter 27' to be directed to a specific area. In a night combat environment, a friendly can identify the light source while the user can direct the light toward a known friendly aircraft, ship, or area. The IR strobe filter 27 is always moved out of the way when using the blue filter 27'.

As stated above, IR strobe filter 27 is used to generate an IR strobe from bulb 13 when water activated switch 7' is in contact with water. For IR operation, IR strobe filter 27 completely covers bulb 13 and sensor 13'. For sensor 13' to keep the strobe off during daylight hours, and, because only IR passes through IR strobe filter 27, sensor 13' must be IR sensitive. Daylight includes infrared (IR) radiation not visible to humans. The IR radiation in daylight passes through IR strobe filter 27 and impinges on sensor 13'. If IR strobe filter 27 is removed from the IR operation position and manually placed on the side of housing 5 for white light operation, sensor 13' continues to receive IR radiation from direct sunlight and will prevent activation of the strobe during daylight hours.

The present invention can be provided in an alternate embodiment without flash guard 200 which includes IR strobe filter 27 and blue filter 27'. In this embodiment, photosensor 13' will continue to receive IR radiation from direct sunlight. However, sensor 13' will not need to be sensitive to IR radiation if a water activated strobe is constructed without an IR filter, as any sensor that is sensitive to visible light will suffice.

FIGS. 8a and 8b shows the circuit diagram for strobe bulb 13 activation. Once switch actuator 7 is positioned to the "on" position, water activated switch 7' has been triggered, and infrared sensor 13' is not triggered, the strobe bulb 13 will pulse in accordance with the circuit parameters.

Operation of the memory latch circuit is best described by referring to FIG. 8a. When battery power is supplied to J1 and J2, switch S1 must first be closed to activate the circuit. When switch 7' is activated by a water path between J3 and J4, Q2 is turned on. This in turn activates Q7 which allows current to flow through Q3. The flow of current through Q3 to Q2, maintains Q2 in the "on" state, which maintains Q7 in the "on" state, which in turn maintains current to Q3. This sequence also supplies power to the collector of Q1, regardless of what now happens to water activated switch 7'. Hence, once manual switch 7 is on, and water activated switch 7' is engaged, Q2, in conjunction with Q3 and Q7, will latch on and provide current for the rest of the circuit to operate.

Q7 provides current to D5 and hence provides the input to pin 3 of U1. Q7 also provides current to the collector of Q8 through a divider consisting of R10 and R11. R5 can optionally be used in an alternate embodiment where there is no water activated switch. Current passing through Q8 is dependent upon activation by the operation of U1. The output of U1 is dependent upon the input on pins 2 and 3. The input to pin 3 is fed by the activation of Q7 via the above described latching of Q7, Q2, and Q3. However, the input of pin 2, and hence the output of U1, is dependent on whether Q1 is "on" or "off", which controls the state of Q4. Q4 in turn controls the input to pin 2.

When Q1 is turned "on" by reception of infrared or visible light rays, Q4 is turned "on" which supplies the input to pin 2 of U1. In this state, the output of U1 is low, and Q8 will be off. When Q1 turns off by removal of the infrared or light rays, Q4 turns off altering the input to pin 2, causing the output of U1 to go high, turning Q8 on. Q8 then passes current to the remainder of the strobe circuit, as shown in FIG. 8b.

The components comprised primarily of Q8, R10, and R11 provide compensation for the current flowing from Q8 to the reminder of the strobe circuit shown in FIG. 8b. The purpose of the compensation is to provide a constant current to the strobe circuit as the battery voltage drops over time. Typically, a plot of the voltage verses time characteristics of certain batteries, such as mercury type batteries, appears flat over time until it nears the end of the lifetime of the battery, where the voltage drops off rapidly. This is a desirable trait for supplying power to the strobe circuit so the light will continue to flash brightly. However, the use of mercury batteries can be harmful to the environment. Alkaline batteries are desired because they are less harmful to the environment.

The voltage characteristics of alkaline batteries, when plotted with respect to time, show a steady decline of battery voltage over time. This steady decrease in battery voltage can cause a corresponding decrease in strobe light brightness and/or frequency. The compensation components comprised primarily of Q8, R10, and R11 offset the decrease of voltage over time due to the use of alkaline batteries, such that the strobe circuit receives a constant current supply for a predetermined required time, as set by U.S. government operational requirements of 8 hours of continuous operation, and remains bright and at a steady pulse frequency until the end of the useful battery life.

The present invention provides efficient, manually-actuated strobe light filters and light guard to allow a white strobe light, used for emergency location purposes in a water environment, to be converted into a combat useful light that can emit light rays in both the infrared region of the spectrum and in the blue ray region, to allow a person in an emergency situation to be located when in enemy territory or a combat situation. Otherwise, the light can also be used as a normal water-activated survival light to find someone at night in remote locations with a strong, white, pulsed strobe light. Using the infrared spectrum in a combat situation, the device can transmit infrared light below the human visible spectrum to infrared detectors used by friendly forces to locate the downed person. Likewise, using a blue light and a tunnel-like shield around the strobe light, a highly directional line-of-sight emission of blue light rays can be transmitted at night in the direction of friendly forces or vehicles to attract attention, known by friendlies to look for a blue, pulsing light. The flash guard, in accordance with the present invention, can be affixed in conjunction with the housing of a white strobe light.

Other embodiments of the present invention are contemplated and included under the scope of the invention. For example, the light can be provided without a water activated switch, without a light sensor, with or without an IR filter, or in any combination of the features disclosed herein.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A hand-held, portable, water activated rescue light comprising:

a strobe light housing, said housing having a light emitting end and an energy cell storage end;

a high intensity strobe bulb for emitting a white light connected to said housing proximate said light emitting end;

a hood in slidable telescopic engagement with said housing, said hood having a first end and a second end, said hood being selectively movable between a retracted position wherein said housing light emitting end extends beyond said hood first end thereby allowing emission of white light substantially hemispherically about said housing light emitting end, and an extended position wherein said hood first end extends beyond said housing light emitting end for shielding light thereby allowing emission of light unidirectionally;

a light filter connected to said housing and movable between an inoperable position wherein said light filter is substantially planar and is disposed between said housing and said hood, and an operable position wherein said light filter covers said housing light emitting end, said light filter automatically urged to said operable position by a means for biasing, said means for biasing activated by movement of said hood relative to said housing;

an electrical circuit within said housing connected to said high intensity strobe bulb;

said housing including a two-position switch for selectively activating said electrical circuit;

a light sensor connected to said light emitting end of said housing for activating said electrical circuit when sunlight impinges said sensor; and a water activated switch connected to said housing for activating said electrical circuit to energize said high intensity strobe bulb when water contacts said water activated switch.

2. The light as claimed in claim 1 wherein said light filter comprises a blue light filter.

3. The light as claimed in claim 1, wherein said light sensor is an infra-red light sensor for activating said electrical circuit when only infra-red light impinges said sensor.

4. The light as claimed in claim 3, further including:

a second light filter pivotally connected to said housing and selectively movable between an operable position wherein said second light filter covers said hood first end, and an inoperable position wherein said hood first end is uncovered.

5. The light as claimed in claim 4, wherein said second light filter comprises an infra-red light filter.

6. The light as claimed in claim 1 further comprising at least one energy cell stored in said energy cell storage end and electrically connected to said bulb by said electrical circuit.

7. A hand-held, portable water activated rescue light for friendly or combat environments comprising:

a strobe light housing, said housing having a light emitting end and an energy cell storage end;

a high intensity strobe bulb for emitting a white light connected to said housing proximate said light emitting end;

a hood in slidable telescopic engagement with said housing, said hood having a first end and a second end, said hood being selectively movable between a retracted position wherein said housing light emitting end extends beyond said hood first end thereby allowing emission of white light substantially hemispherically about said housing light emitting end, and an extended position wherein said hood first end extends beyond said housing light emitting end for shielding light thereby allowing emission of light unidirectionally;

a first light filter pivotally connected to said housing and selectively movable between an operable position wherein said first light filter covers said hood first end, and an inoperable position wherein said hood first end is uncovered;

a second light filter connected to said housing and movable between an inoperable position wherein said second light filter is substantially planar and is disposed between said housing and said hood, and an operable position wherein said second light filter covers said housing light emitting end, said second light filter automatically urged to said operable position by a means for biasing, said means for biasing activated by movement of said hood relative to said housing;

an electrical circuit within said housing connected to said high intensity strobe bulb;

said housing including a two-position switch for selectively activating said electrical circuit;

an infra-red light sensor connected to said light emitting end of said housing for activating said electrical circuit when only infra-red light impinges said sensor; and a water activated switch connected to said housing for activating said electrical circuit to energize said high intensity strobe bulb when water contacts said water activated switch.

8. The light as claimed in claim 7, wherein said first light filter comprises an infra-red light filter.

9. The light as claimed in claim 7 wherein said second light filter comprises a blue light filter.

10. The light as claimed in claim 7 further comprising at least one energy cell stored in said energy cell storage end and electrically connected to said bulb by said electrical circuit.

11. The light as claimed in claim 7 wherein said electrical circuit includes memory latch means to maintain activation of said electrical circuit after said electrical circuit is activated by said water activated switch.

* * * * *